T. H. Pein,

Photographic Apparatus,

№ 25,276. Patented Aug. 30, 1859.

Witnesses
Charles Wehle

Inventor
T. H. Pein

UNITED STATES PATENT OFFICE.

JOHN H. PEIN, OF HOBOKEN, NEW JERSEY.

APPARATUS TO PHOTOGRAPH ON UNEVEN SURFACES.

Specification of Letters Patent No. 25,276, dated August 30, 1859.

*To all whom it may concern:*

Be it known that I, JOHN HENRY PEIN, of the city of Hoboken, in the State of New Jersey, have invented a new and useful Method of Photographing on Uneven Surfaces; and I do hereby declare that the following is a full and exact description thereof, reference being had to the annexed drawings, making part of this specification, in which—

Figure 1:
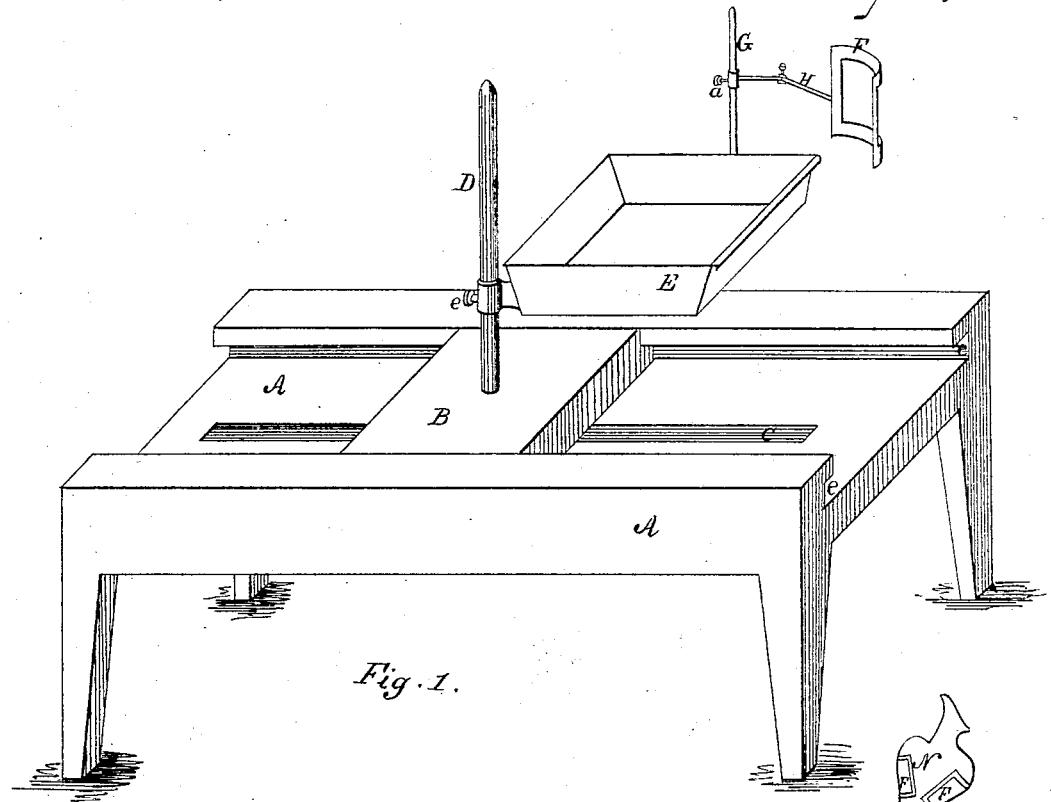
Figure 2:
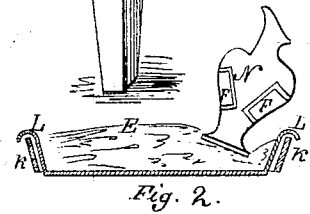
Figure 3:
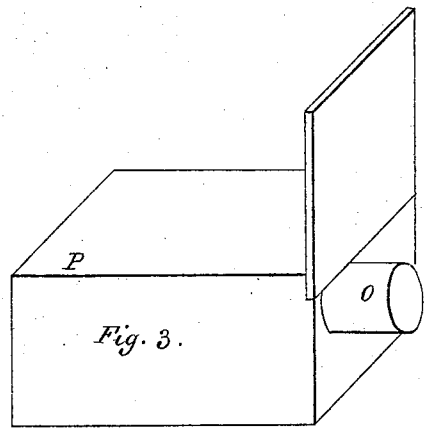
Figure 4:
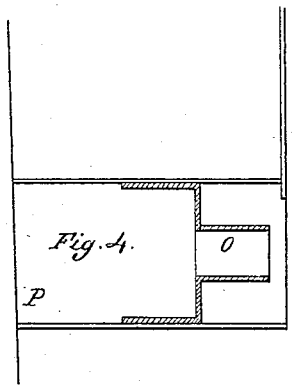

Figure 1, is a perspective view of the instrument employed for that purpose. Fig. 2, a section of the pan employed. Fig. 3, a perspective view of part of the camera. Fig. 4, a vertical section of the same.

I deem it proper to state, that the camera, usually employed for photographing on even surfaces, contains a plate of ground glass, placed in a slide in the camera, and the focus is found by moving the whole camera, and the ground glass is replaced by the frame containing the plate for the picture, when the focus will be transferred to the same plate. For taking photographs on uneven surfaces this method could not be applied, for an irregular shaped body could not be put into the frame of the camera in place of the ground glass.

The nature of my invention consists in obtaining the focus on the uneven surface of a solid direct by a device for moving the said solid in the camera, without moving the camera, and for placing the said solid in any desired position sidewise, backward or forward.

To enable others skilled in the art to make and use my invention, I will proceed to describe its construction and operation.

In the annexed drawing A represents a bench or table, B a horizontal sliding piece admitting of regular horizontal reciprocating movements, by means of the groove $c$, and the lateral grooves $e\ e$, in which the tongues of B are moved and guided. A vertical pin D passes through the groove $c$ and through the plate B, it is continued above and below the top of the bench in such a manner, that it may be, fastened below by means of a nut and screw or otherwise, and that the plate B may be fixed in any desired position. A pan holder E is connected with the said pin by means of a hollow cylinder at $e$ moving vertically or horizontally on the said pin and capable of being fastened to the same in any position. The pan holder E is provided with a similar vertical pin G, which is connected with a frame F for the picture, attached to the said pin G by means of movable arms H, hollow cylinder and screw $a$, and arm screw $e'$, in such a manner that the frame F may be moved and fixed to any required position.

The pan holder E is so constructed that a pan L may be fixed to it, or removed therefrom. The camera employed for this purpose is similar to that in use for photographing on even surfaces, except that the tube O containing the lens is connected with an internal frame, so that it may slide forward or backward in accordance with the size of the picture, which is to be produced.

If a photographic picture is to be produced by the device, thus described, on a vase or other irregular shaped object I proceed in the following manner. I fill the pan L with clay, putty or other plastic material and then press the base of the vase N in the clay in such a manner that the surface F' to be occupied by the picture is to have a vertical position. I now place the pan containing the vase on the panholder E in the camera in such a manner that the surface to be occupied by the picture or picture frames F or F' should be opposite the lens of the tube O. I then slide the plate B horizontally and the pan E vertically and horizontally until the space for the picture is determined. The frame F for the picture being formed of tin or of similar flexible material corresponding with the size of the picture and bent or shaped to the surface of the vase, is then fitted tightly to the vase by means of the arms H and the screw $e$, in such a way that the picture should appear in the central portion of the said frame F, which is now fastened and secured in this position by means of the screws at $a$ and $e'$. The vase is then gently removed from the camera and is prepared with a sensitive coating, and then by a nitrate of silver bath and· again replaced into the impression which was previously made in the clay, it is then so turned and placed that the vase should occupy the exact position, entertained prior to its preparation. The picture which serves as the original for the photographic copy on the vase is placed in front of the lens of the movable tube O, the distance of the lens from the original depending upon the desired size and being attained by moving the tube O in the external tube P. The picture is then copied and developed in the usual manner.

It will be observed that the focus having been obtained, it is essential to place the vase in the exact position in which the focus was determined.

The hollow cylinders at E and *a* serve to turn or to rotate the pan E and the frame F to facilitate the changes in the position of the vase and the frame required for the various size, shape and attitude of the photographic pictures, which are to be produced.

What I claim as new and desire to secure by Letters Patent is:

Photographing on vases or on other uneven solids by means of an apparatus substantially as herein described and in the manner substantially as set forth.

Dated New York June 11, 1859.

J. H. PEIN.

Witnesses:
CHARLES WEHLE,
M. CUFFRAIDE.